United States Patent [19]
Awaji

[11] Patent Number: 5,920,559
[45] Date of Patent: Jul. 6, 1999

[54] VOICE INFORMATION SERVICE SYSTEM TO BE CONNECTED TO ATM NETWORK

[75] Inventor: Toshio Awaji, Kawasaki, Japan

[73] Assignee: Fujitsu Limited, Kanagawa, Japan

[21] Appl. No.: 08/794,006

[22] Filed: Feb. 3, 1997

[30] Foreign Application Priority Data

Mar. 15, 1996 [JP] Japan ..................................... 8-058924

[51] Int. Cl.⁶ ............................... H04L 12/54; H04J 3/26
[52] U.S. Cl. .................... 370/392; 370/397; 370/428; 370/474; 379/88.17; 379/88.27
[58] Field of Search .................................... 370/389, 392, 370/395, 396, 397, 400, 409, 412, 428, 429, 470, 471, 474; 379/67.1, 88.07, 88.08, 88.17, 88.18, 88.22, 88.27

[56] References Cited

U.S. PATENT DOCUMENTS

| | | | |
|---|---|---|---|
| 5,513,174 | 4/1996 | Punj | 370/428 |
| 5,526,353 | 6/1996 | Henley et al. | 370/395 |
| 5,544,169 | 8/1996 | Norizuki et al. | 370/395 |
| 5,654,964 | 8/1997 | Wake | 370/395 |

FOREIGN PATENT DOCUMENTS

A-4-157843 5/1992 Japan .

*Primary Examiner*—Alpus H. Hsu
*Attorney, Agent, or Firm*—Helfgott & Karas, P.C.

[57] ABSTRACT

The present invention relates to a voice information service system to be connected onto an ATM network. An object of the present invention is to solve the problem that the installation cost of a voice information service system increases proportionally to the number of channels and to provide an inexpensive voice information service system. The voice information service system includes a voice buffer for temporarily storing voice information with a given length read from a voice file for storing digitized voice information, and a cell assembler for appending an SAR header and cell header to voice information existent in the voice buffer. A control unit includes a cell control table for storing cell control information associated with a plurality of virtual channels, controls calls by transmitting or receiving control signals onto or from the ATM network via a signal cell assembler dissembler, references areas associated with an available virtual channel in the cell control table upon call termination, produces a voice cell to be placed on the virtual channel at regular intervals using the cell assembler and cell control table, and then transmits the voice cell to a calling side.

13 Claims, 12 Drawing Sheets

VOICE INFORMATION SERVICE SYSTEM TO BE CONNECTED TO ATM NETWORK

BACKGROUND OF THE INVENTION

1. Field of the Invention

The present invention relates to a voice information service system, or more particularly, to a voice information service system to be connected to an ATM network for providing a voice information service to numerous users via the ATM network.

In recent years, technologies supporting communication networks have changed from technologies for analog transmission to those for digital transmission or from technologies for a synchronous transfer mode (STM) to those for an asynchronous transfer mode (ATM), have tended toward high-speed and large-capacity communication, and have enabled image communication as well as existing communication of voice and data. The fundamentals of communications are being prepared step by step in pursuit of realization of an advanced information society.

Now that a broadband integrated services digital network (B-ISDN) is prevailing, the present invention provides a means for realizing a service of providing voice information, that is the basis of communication, at lower cost than a known voice information service system while making the most of the features of the B-ISDN.

2. Description of the Related Art

For providing an existing voice information service, numerous telephone terminals are accommodated in a network (a switching network capable of handling analog signals or STM digital signals), and a system (IP system) owned by an information provider (IP) is also accommodated as a terminal in the network. In this case, the IP system is, for example, a system for not only rendering a voice information service for providing time, weather forecasts dependent on local districts, and the like, but also for providing various kinds of voice information such as news for a fee.

To receive a voice information service, a subscriber of a telephone terminal dials a number set in the IP system. In this case, various dial numbers are associated with various voice information services; XXX for a time service, YYY for a weather forecast service, and a predetermined number for news. The network carries out switching and connection according to a dialed number and thus links the telephone terminal to the IP system. The IP system reads accumulated message information upon call termination. The telephone terminal receives the information. After the reception, the telephone terminal clears the call.

As mentioned above, in the known system for rendering a voice information service, the communication network operates in STM. The side of rendering a service and the side of receiving the service must be linked on a one-to-one basis during information transmission. Equipment such as a trunk to be included in an exchange must be installed for each user. In other words, if the number of trunks each having complex facilities is decreased, the probability of a line being busy rises. If numerous trunks are installed, there arises a problem that the operation rate deteriorates and cost increases.

In contrast, when systems each shared by a plurality of users are employed, even if access is gained to a system, much information cannot be heard from the start thereof because of a competitive situation.

There is the trend of communication networks toward B-ISDNs. Under the circumstances, voice services are still important services. With the advent of a communication network having the feature of high-speed and large-capacity communication, an information communication fee must be lowered.

SUMMARY OF THE INVENTION

An object of the present invention is to overcome the existing problem that installation costs increase proportionally to the number of trunks by utilizing the technologies underlying the B-ISDN (ATM), and to provide a more inexpensive voice information service system.

According to the present invention, there is provided a voice information service system to be connected onto an ATM network for rendering voice information service over a plurality of virtual channels comprising: a voice file for storing digitized voice information; a voice buffer for temporarily storing voice information with a given length transferred from the voice file; a voice cell assembly circuit for appending an SAR header and cell header to voice information existent in the voice information; a cell control table for storing cell control information in one-to-one correspondence with virtual channels of a plurality of incoming calls; a signal cell assembler and dissembler for transmitting or receiving signal cells to or from the ATM network; and a control unit being activated at regular intervals, using the cell control table to control the voice file and cell assembler so as to control production and transmission of voice information cells to be placed on virtual channels, and processing control signals to be transmitted or received to or from the ATM network via the signal cell assembler dissembler.

According to the present invention, the voice information service system further comprises a cell multiplexer separator for multiplexing signal cells sent from the signal cell assembler dissembler and cells containing voice information to be placed on a plurality of virtual channels, and sending the resultant cells to the ATM network, and for separating signal cells sent from the ATM network and transferring the cells to the signal cell assembler dissembler. Logical connection or release of virtual channels to or from the ATM network via the signal cell assembler dissembler is controlled by handling links for signal cells as virtual channels.

According to the present invention, the control unit controls logical connection or release of virtual channels to or from the ATM network by transmitting or receiving signal cells via the signal cell assembler dissembler. The cell control table has areas for storing channel states each indicating whether or not a channel is in service, virtual channel identifiers, SAR headers of AAL Type 1, pointers for use in reading a voice file memory respectively in one-to-one correspondence with virtual channels. The control unit initializes the contents of areas associated with an available virtual channel in the cell control table at the time of call termination, and produces a voice cell.

The control unit transmits voice information cells over the same virtual channel in a cycle of 5.875 msec., and thus transmits the voice information cells to the ATM network at a fixed speed. The control unit is activated in a cycle of a quotient of 5.875 msec. by N when a maximum number of virtual channels N are accommodated in the voice information service system, whereby the cell transmission density of a virtual path linking the ATM network with the voice information service system is kept constant.

Furthermore, the control unit includes a table counter for indicating an address of the cell control table associated with a virtual channel. At every cyclic activation, the control unit reads cell control information concerning a virtual channel to be processed at that time instant from associated areas in the cell control table indicated by the table counter, reads voice information of 47 bytes tong from a position pointed to by a pointer for use in reading the voice file memory which is contained in the read cell control information, and updates the pointer in the cell control table after the reading. For establishing logical connection of a new virtual channel, the control unit appends a pointer for use in reading the voice file memory which is specified in an area associated with the virtual channel in the cell control table to the start of voice information, and thus marks the head of voice information for each virtual channel.

The control unit includes a processor for controlling calls to be transferred to or from the ATM network via the signal cell assembler dissembler, and a cell production control unit having the cell control table and controlling the cell assembler.

BRIEF DESCRIPTION OF THE DRAWINGS

The present invention will be more clearly understood from the description as set forth below with reference to the accompanying drawings.

DESCRIPTION OF THE PREFERRED EMBODIMENTS

To begin with, prior to embodiments of the present invention, related arts will be described briefly using FIGS. 1A to 4.

Figure 1A:
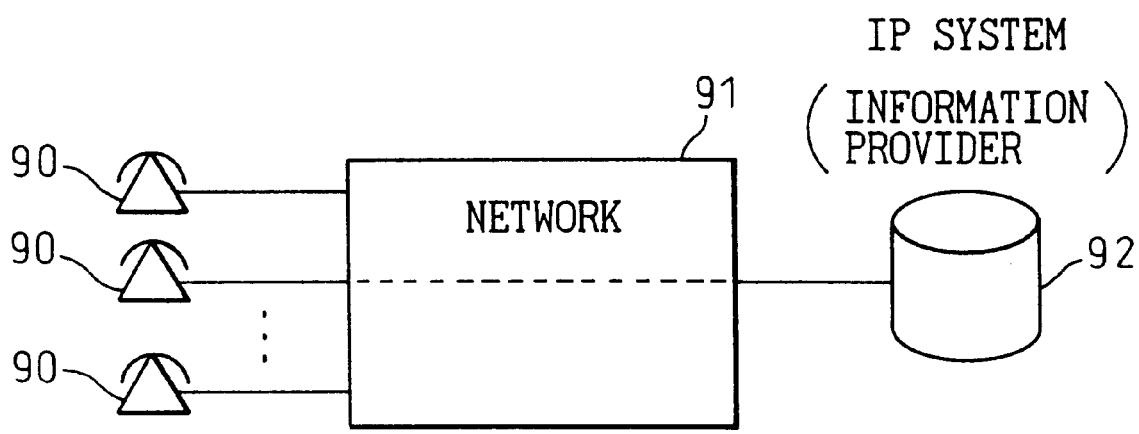
FIG. 1A is an explanatory diagram (1) of an existing voice information service.
Figure 1B:
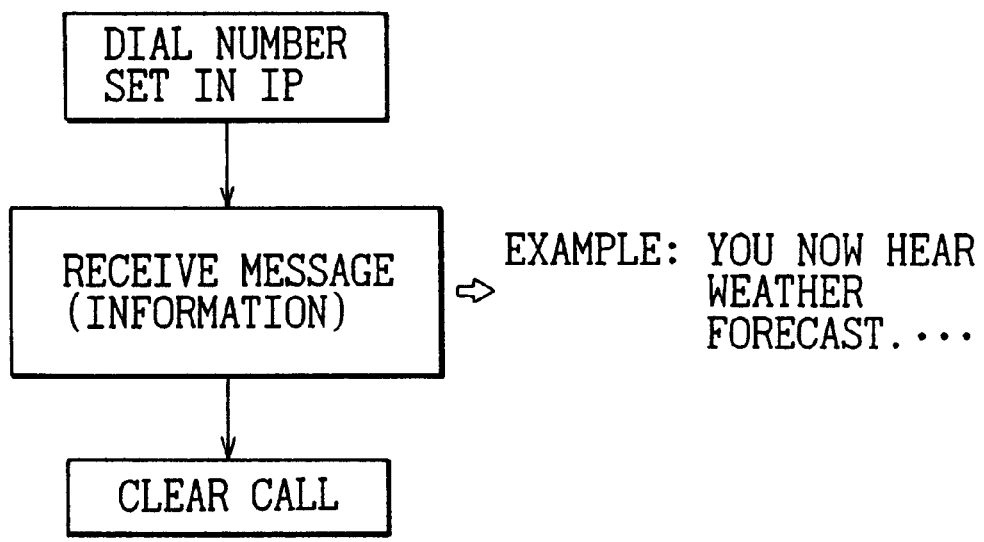
FIG. 1B is an explanatory diagram (2) of an existing voice information service.

FIGS. 1A and 1B are explanatory diagrams of an existing voice information service.

As shown in FIG. 1A, numerous telephone terminals 90 are accommodated in a network 91 (switching network capable of handling analog signals or STM digital signals), and a system (IP system) 92 owned by an information provider (IP) is also accommodated as a terminal in the network 91. In this case, the IP system 92 may be a system for not only rendering a voice information service for giving time, weather forecast dependent on each local district but also providing various kinds of voice information such as news for a fee.

The operation of a telephone terminal 90 for receiving a voice information service is shown in FIG. 1B. A subscriber of the telephone terminal 90 dials a number set in the JP system 92. In this case, numbers are associated with various voice information services; such as XXX for a time service, YYY for a weather forecast service, and a predetermined number for news. The network 91 carries out switching and connections according to the dialed number, and thus links the telephone terminal 90 to the IP system 92. The IP system 92 reads accumulated message information upon call termination. The telephone terminal 90 receives the information. After the reception is completed, the telephone terminal 90 clears the call.

Figure 2:
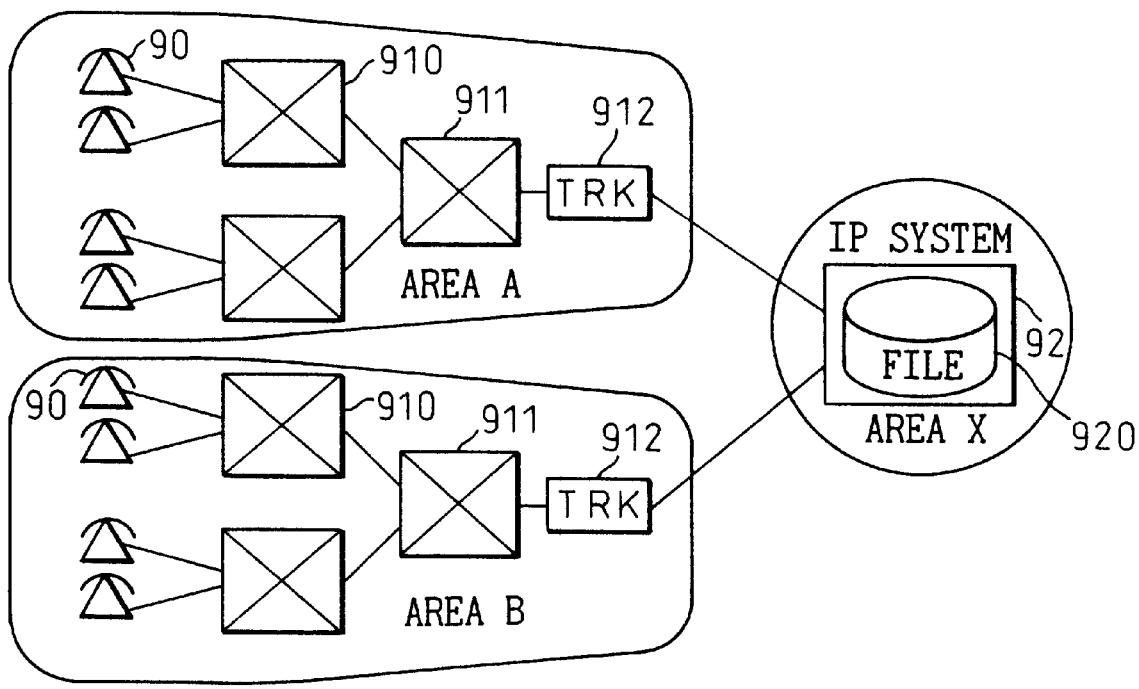
FIG. 2 is a diagram illustrating a form (part 1) for realizing the existing voice information service.
Figure 3:
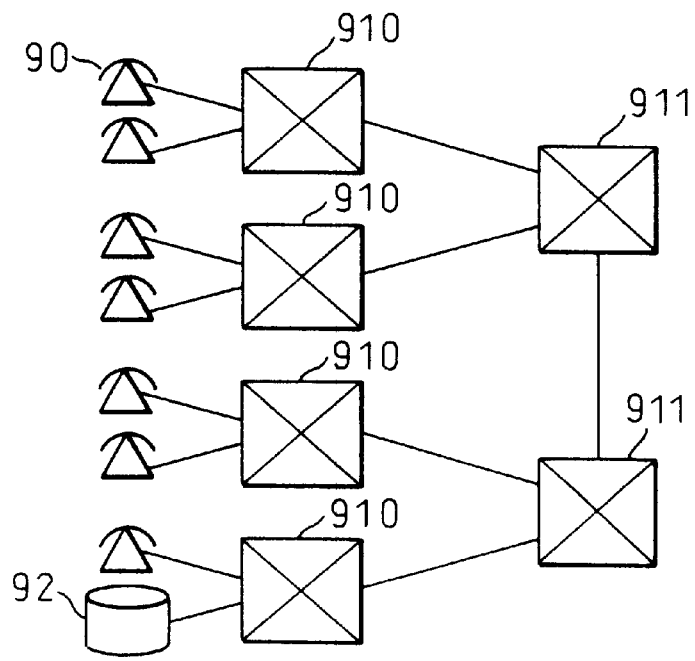
FIG. 3 is a diagram illustrating a form (part 2) for realizing the existing voice information service.

FIGS. 2 and 3 illustrate forms (parts 1 and 2) for realizing the existing voice information service.

FIG. 2 illustrates an example of a meteorological information service. A plurality of exchanges 910 each accommodating subscribers of telephone terminals 90 are installed in each of areas A and B, and connected to an IP system 92 installed in area X that is the same area or an adjoining area over a leased line or public network by way of a trunk (TRK) 912 coupled to a major exchange 911 in each area which is superior to the plurality of exchanges 910. The IP system 92 includes a file 920 in which voice information of a weather forecast, dependent on each local district, is recorded. This form is adapted to a case in which a communication company renders an information supply service. A fee is collected as a communication fee. Needless to say, when the use frequency is high, users and facilities for rendering services are preferably located mutually adjacent within an area.

In the case of FIG. 2, when a subscriber dials the number set for the weather forecast service at a telephone terminal 90, the telephone terminal 90 is connected to the upper-level exchange 900 through an exchange 910 in which the telephone terminal 90 is accommodated, and then linked to the IP system 92 over the trunk (TRK) 912. Consequently, meteorological information concerning a desired district is reported by voice.

FIG. 3 shows an example in which a communication company renders an information supply service. Telephone terminals 90 are accommodated in each of exchanges 910. Exchanges 911 are installed as exchanges superior to the exchanges 910. In the case of FIG. 3, the IP system 92 owned by the information provider is linked like the general telephone terminals 90 to the exchanges 910. When a number predetermined for rendering the information supply service is dialed at a telephone terminal 90, the telephone terminal 90 is linked to the IP system 92. Consequently, the information supply service is rendered. A fee includes a communication fee and an information supply fee in general, the communication company collects the fees.

Figure 4:
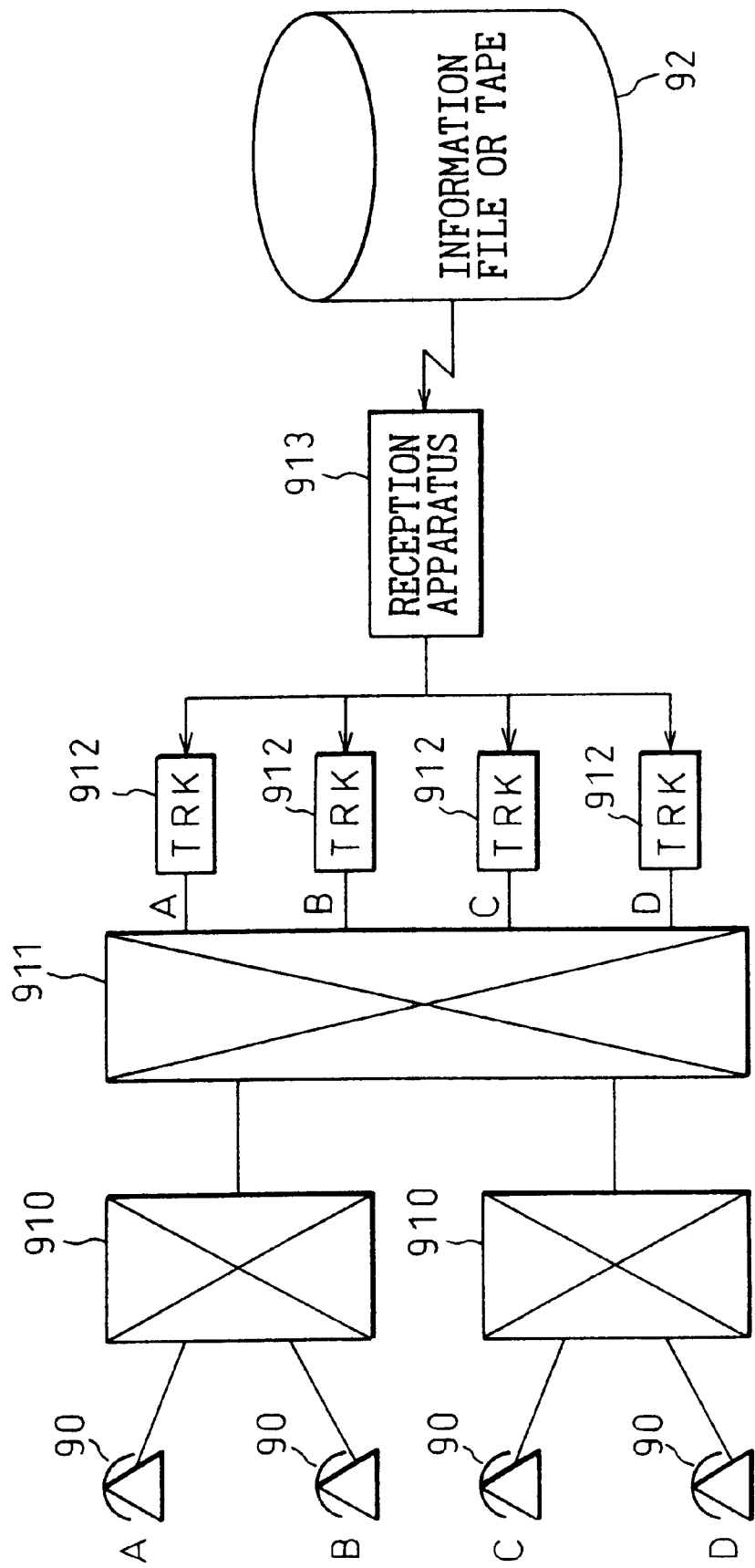
FIG. 4 is a diagram illustrating the voice information service shown in FIG. 2 in detail.

FIG. 4 is a diagram illustrating the voice information service shown in FIG. 2 in detail.

In FIG. 4, there are shown the same components 90, 910, 911, 912, and 92 as those shown in FIG. 2. Reference numeral 913 denotes a reception apparatus.

A plurality of trunks (TRK) 912 coupled to the upper-level exchanges 911 are assigned numbers corresponding to telephone numbers. A typical number, for example, 177 is used as a telephone number to be dialed by users. The number 177 is converted into the number assigned to an available trunk by the exchange 911, whereby a link is established. Voice information read from an information file in the IP system 92 or from a magnetic tape is temporarily received and accumulated in the form of a digital signal (PCM coded) by the reception apparatus 913, and then distributed to the plurality of trunks (TRK) 913.

When a number for designating a service (for example, 177) is dialed at a telephone terminal 90 (any of A to D), the telephone terminal is connected to the exchange 911 via an exchange 910, and then linked to any of the different trunks 912. Over each trunk, access is gained to the reception apparatus 913. Voice information is then read. The voice information is then transmitted to the telephone terminal 90 that is a calling side. The digital signal is converted into an analog signal at an intermediate step in the process of output from the telephone terminal 90.

The present invention will be described below.

Figure 5:
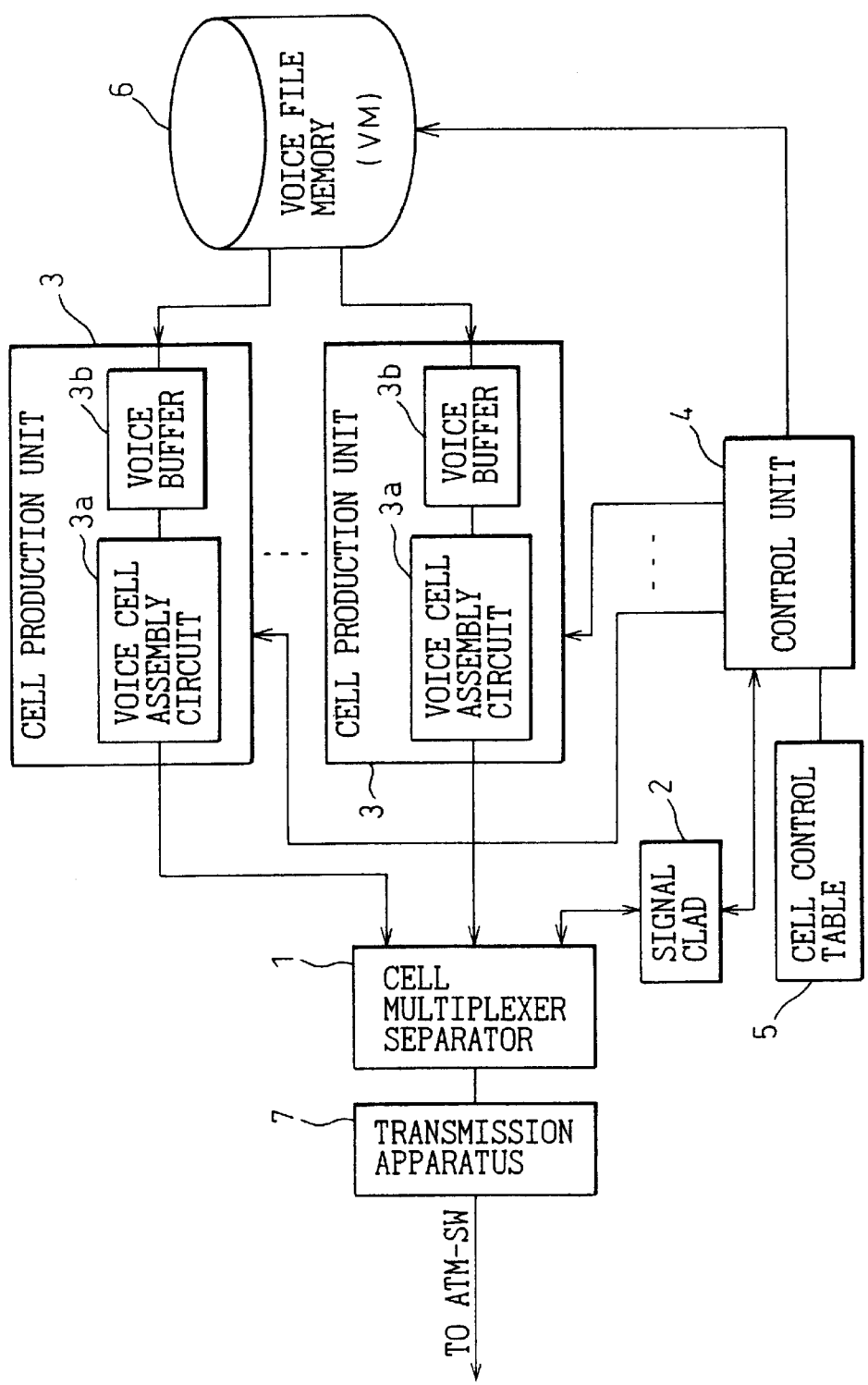
FIG. 5 is a diagram illustrating the principles and constituent features of the present invention.

FIG. 5 is a diagram illustrating the principles and constituent features of the present invention.

In FIG. 5, there are shown a cell multiplexer separator 1, a signal cell assembler and dissembler (signal CLAD) 2, cell production units 3, voice cell assembly circuits 3a, voice buffers 3b, a control unit 4, a cell control table 5, a voice file memory (VM) 6, and a transmission apparatus 7 connected to an exchange (not shown) by way of a line (a coaxial cable or optical fiber cable).

When a call to be terminated at the voice information service system shown in FIG. 5 is originated from a voice terminal accommodated in an exchange, a signal cell containing information of call termination is supplied from the transmission apparatus 7 to the cell multiplexer separator 1. The cell is separated by the cell multiplexer separator 1, and dissembled by the signal cell assembler and dissembler 2. A control signal is then fed to the control unit 4. The control unit 4 produces a control signal responsive to the incoming call. The control signal is converted into a signal cell by the signal cell assembler and dissembler 2, and then transmitted to the calling side.

The control unit 4 sets cell control information including a state of a channel coupled to a cell production unit 3 for handling the incoming call, a virtual channel identifier (VCI), and a pointer for use in reading the voice file memory 6 in the cell control table 5, reads leading voice information of 47 bytes long (PCM-coded signal) successively from the voice file memory 6, and stores the information in the voice buffer 3b in the cell production unit 3. Thereafter, the control unit 4 supplies a header of 5 bytes long composed of information specified in the cell control table 5 and predetermined parameter information of a header, and a segmentation and reassembly sublayer (SAR) header of ATM Adaptation Layer (AAL) Type 1 of 1 byte long to the voice cell assembly circuit 3a connected to the voice buffer 3b. These headers and the voice information of 47 bytes long stored in the voice buffer 3b are assembled into a cell of a total of 53 bytes long. The cell is then sent to the cell multiplexer separator 1. The cell is multiplexed together with cells sent from the other cell production units 3 by the cell multiplexer and separator 1, and then sent over a Line through the transmission apparatus 7. PCM codes of voice (one sample is 1 byte long) sampled at 8 kHz (in a cycle of 125 microseconds) are stored in the voice file memory 6. Information for one cell (47 bytes) is transmitted in a cycle of 125 microseconds * 47=5.875 msec.

Referring to FIG. 5, a plurality of cell production units 3 are associated with virtual channels for individual incoming calls. By raising the processing speed of the system, a two-fold number of services can be rendered over each channel. Moreover, one cell production unit 3 may be shared by numerous virtual channels. In this case, voice cells to be placed on the channels can be produced by performing multiplexing (For details, see FIGS. 9 to 13).

Figure 6:
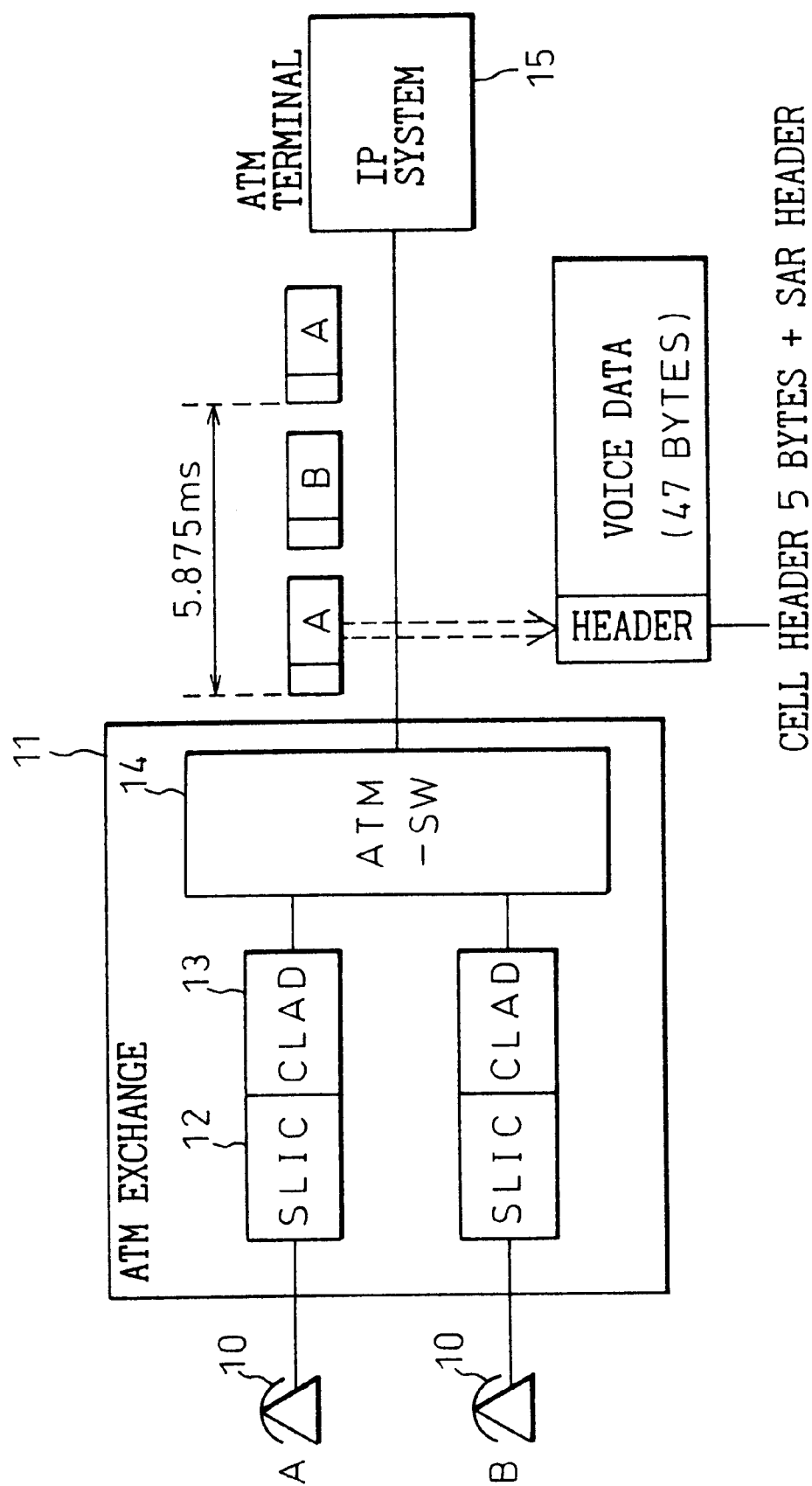
FIG. 6 is a diagram illustrating a form for transferring voice cells from a voice information service to terminals.

FIG. 6 shows a form for transmitting voice cells from the voice information service system of the present invention to terminals.

In FIG. 6, there are shown analog terminals (conventional telephones) 10. Two terminals A and B alone are shown in FIG. 6. Also shown are an ATM exchange 11, subscriber line circuits (SLIC) 12 each having a coder/decoder (CODEC) therein, cell assembler and dissembler (CLAD) 13, an ATM switch (ATM-SW) 14, and an ATM terminal of an information provider (IP) 15 which includes a voice information service system (IP system).

In the ATM exchange 11, the subscriber line circuits 12 each (onvert an analog signal to a digital signal or vice versa. The cell assembler and dissemblers 13 each assemble digital signals into a cell signal or disassemble a cell signal into digital signals. A cell signal is switched over to an intended route by the ATM switch 14. After the two terminals A and B each issues a request for a voice information service and are then linked to the ATM terminal 15, voice information to be sent from the ATM terminal 15 to the terminals is multiplexed in the form of ATM cells and sent to the ATM exchange 11.

At this time, each of ATM cells addressed to terminals A and B is, as shown in FIG. 6, composed of a cell header of 5 bytes long, an SAR header of 1 byte long, and voice information of 47 bytes long according to the protocol of AAL Type 1. Voice cells destined for each terminal are, as described in conjunction with FIG. 5, transmitted from the ATM terminal 15 at intervals of 5.875 msec. (125 microseconds * 47). Voice cells sent from the ATM terminal 15 to terminals A and B are switched according to the headers thereof (virtual channel identifiers specified in the headers) by the ATM switch 14, converted into analog signals through the cell assembler and (dissemblers 13 and subscriber line circuits 12 associated with terminals A and B, and then sent to the terminals.

Figure 7:
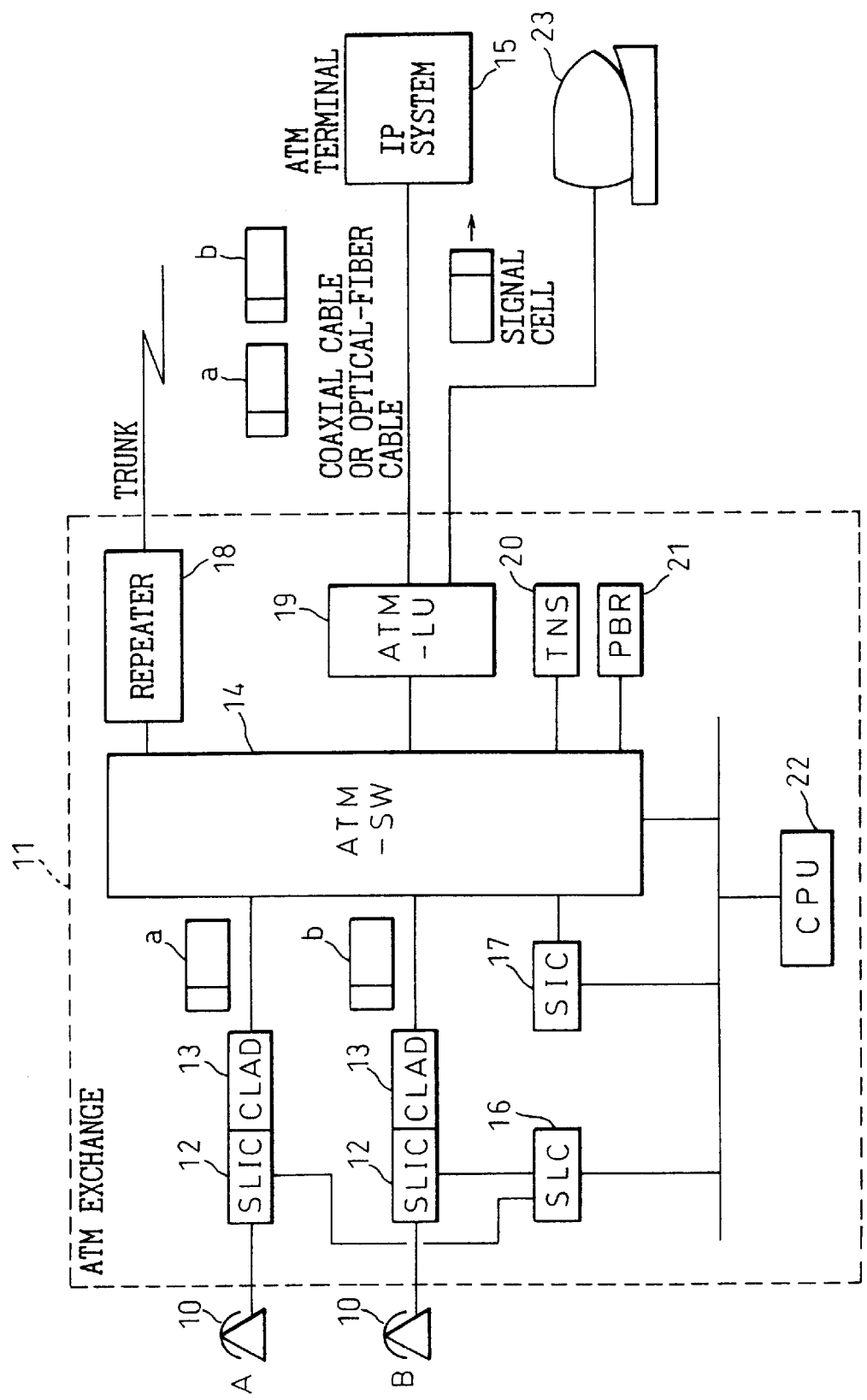
FIG. 7 is a diagram illustrating the configuration of an ATM exchange for linking analog telephones with an ATM terminal.

FIG. 7 shows the (configuration of an ATM exchange (11 in FIG. 6) for linking analog telephones with an ATM terminal (IP).

In FIG. 7, there are shown the same components 10 to 15 as those shown in FIG. 6. The description of the components will be omitted. The ATM exchange 11 includes an SLIC control circuit (SLC) 16 for controlling subscriber line circuits (SLICs), a signal controller (SIC) 17, a repeater 18 for connecting the ATM exchange to another exchange over a trunk, an ATM line unit (ATM-LU) 19 accommodating the ATM terminal 15 and other terminals 23, a tone sender (TNS) 20 for generating a tone signal to be sent to a subscriber, a PB signal receiver (PBR) 21 for receiving a PB signal, and a CPU 22 for controlling the components. Reference numeral 23 denotes another ATM terminal. In the case of FIG. 7, the tone sender 20 and PB signal receiver 21 are accommodated in the ATM switch 14, and each have a cell assembly and dissembly facility. If the tone sender 20 and PB signal receiver 21 are connected to the subscriber line circuits 12, they can handle analog signals.

When a user originates a call at an analog terminal 10 (a user lifts the handset of the analog terminal off-hook), the subscriber line circuit 12 detects the fact and reports it to the CPU 22 in the exchange via the SLIC control circuit 16. The CPU 22 allows the tone sender 20 to transmit a dial tone to the calling terminal via the ATM switch 14, and causes the PB signal receiver 21 to receive the number dialed by the user. The CPU 22 translates the dialed numeral sent from the PB signal receiver 21, and identifies a link destination. Thereafter, the CPU 22 allows the signal controller 17 to produce an activation signal cell for activating the link destination and then send the signal to the link destination.

Figure 8:
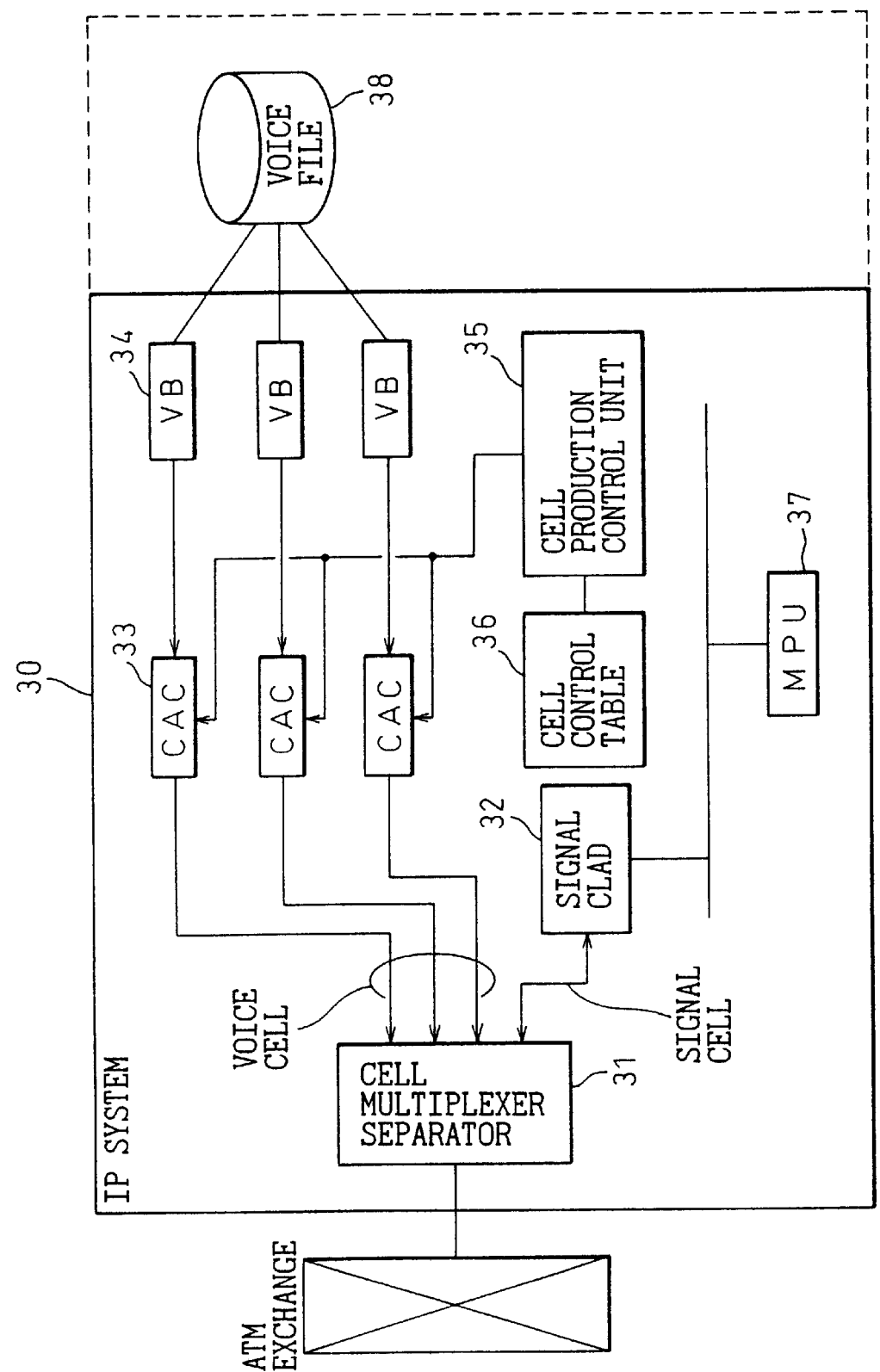
FIG. 8 a diagram illustrating an example of the configuration of an IP system.

FIG. 8 shows a first example of the configuration of an IP system. This example includes a voice cell assembly circuit and voice buffer for each virtual circuit.

In FIG. 8, there are shown an IP system 30 (identical to the ATM terminal 15 in FIG. 7), a cell multiplexer separator 31, and a signal cell assembler and dissembler 32. Reference numerals 33 and 34 denote components for producing cells to be placed on respective virtual channels. There are shown voice cell assembly circuits (CAC) 33 and voice buffers (VB) 34 each having a capacity for one cell (47 bytes).

Also shown are a cell production control unit 35, a cell control table (CCT) 36, a microprocessor unit (MPU) 37, and a voice file 38. The voice file 38 is located outside the IP system 30. Alternatively, the voice file 38 may be incorporated in the IP system. Moreover, the voice file 38 may be formed with a semiconductor memory such as a DRAM if the access time must be short.

In this example of the configuration, three pairs of cell assembly circuits 33 and voice buffers 34 are included in order to send voice information in response to calls originating from a plurality of subscribers. The cell production control unit 35 uses the cell control table 36 to control reading of a cell header associated with each virtual channel and voice information read from a voice file 38 and to control cell assembly and transmission under the control of the microprocessor unit 37. The signal cell assembler dissembler 32 carries out assembly to produce a signal cell for use in transferring a control signal between the ATM exchange and the MPU 37, or dissembles the signal cell in the configuration shown in FIG. 8, the voice cell assembly circuits 33 and voice buffers 34 are associated with virtual channels. When the processing speeds of each pair of a voice cell assembly circuit and voice buffer are raised, each pair can multiplex signal cells to be placed on a plurality of channels. In this case, needless to say, the cell production control unit 35 and other components must also operate at corresponding speeds.

In the case of FIG. 8, equipment is arranged for each service channel. The advantage of adopting the ATM technology is not utilized fully. The features of the ATM are that numerous virtual channels can be set for one physical channel and that a high transfer rate can be set independently of a voice reproduction speed. Owing to these features, it becomes possible to share a system by channels and ensure a larger capacity. An example of the configuration for making the most of the features will be described below.

Figure 9:
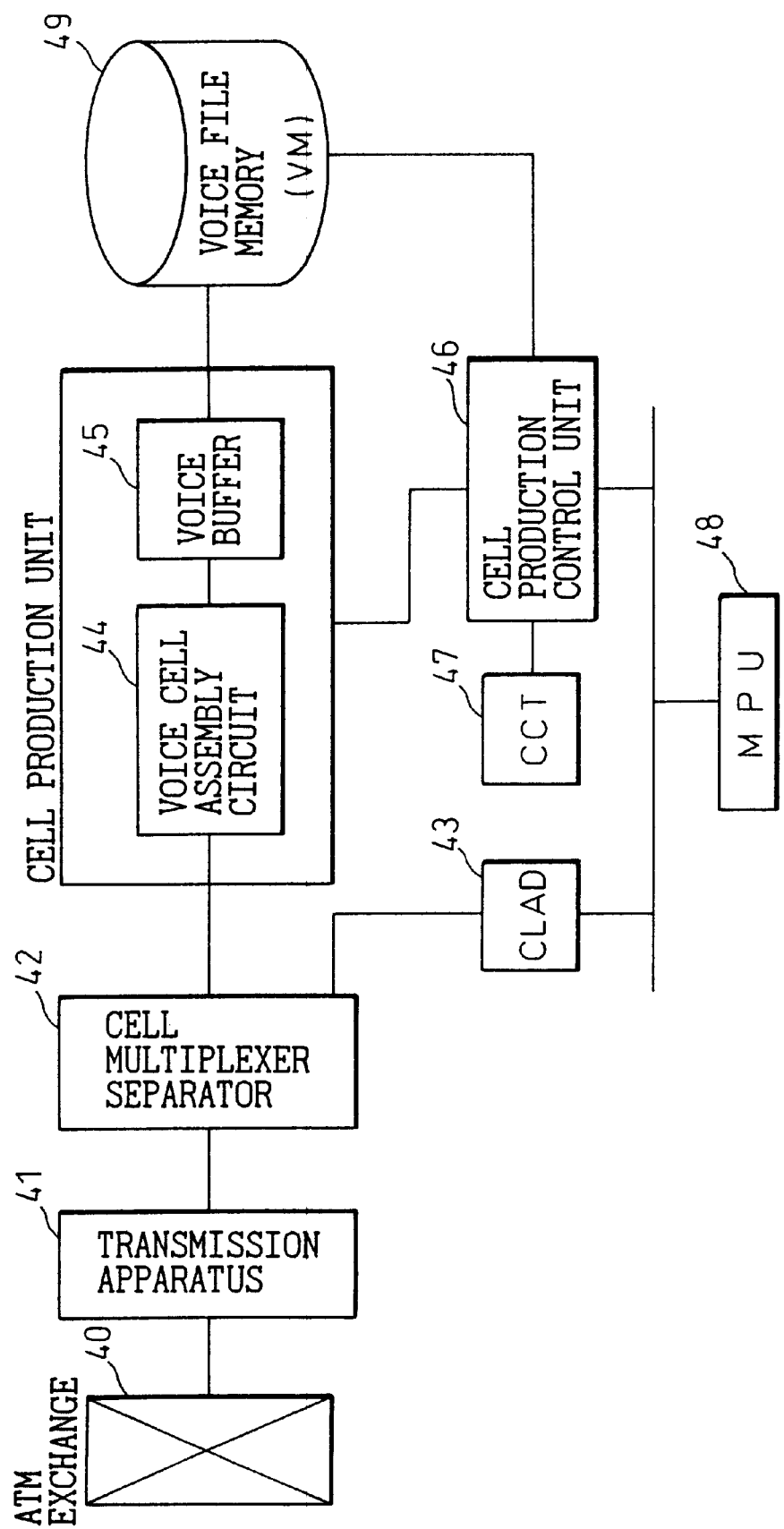
FIG. 9 is a diagram illustrating an example of the configuration of an IP system in which components for producing a voice cell are shared.

FIG. 9 shows an example of the configuration of an IP system in which components for producing a voice cell are shared.

In FIG. 9, there are shown an ATM exchange 40, a transmission apparatus 41 connected to the ATM exchange 40 over a coaxial cable or optical-fiber cable, a cell multiplexer separator 42, and a signal cell assembler dissembler (CLAD) 43. Reference numerals 44 and 45 denote components for producing a cell. Also shown are a voice cell assembly circuit 44, a voice buffer (VB) 45 having a capacity of 47 bytes, a cell production control unit 46, a cell control table (CCT) 47, a microprocessor unit (MPU) 48, and a voice file memory (VM) 49.

In the configuration shown in FIG. 9, the voice cell assembly circuit 44 and voice buffer 45 are shared by a plurality of virtual channels (VCI). Unlike the configuration shown in FIG. 8, a pair of a voice cell assembly circuit and voice buffer need not be installed for each virtual channel. The voice cell assembly circuit 44 and voice buffer 45 are operated in time sharing. This leads to a reduction in the cost of the IP system.

Figure 10:
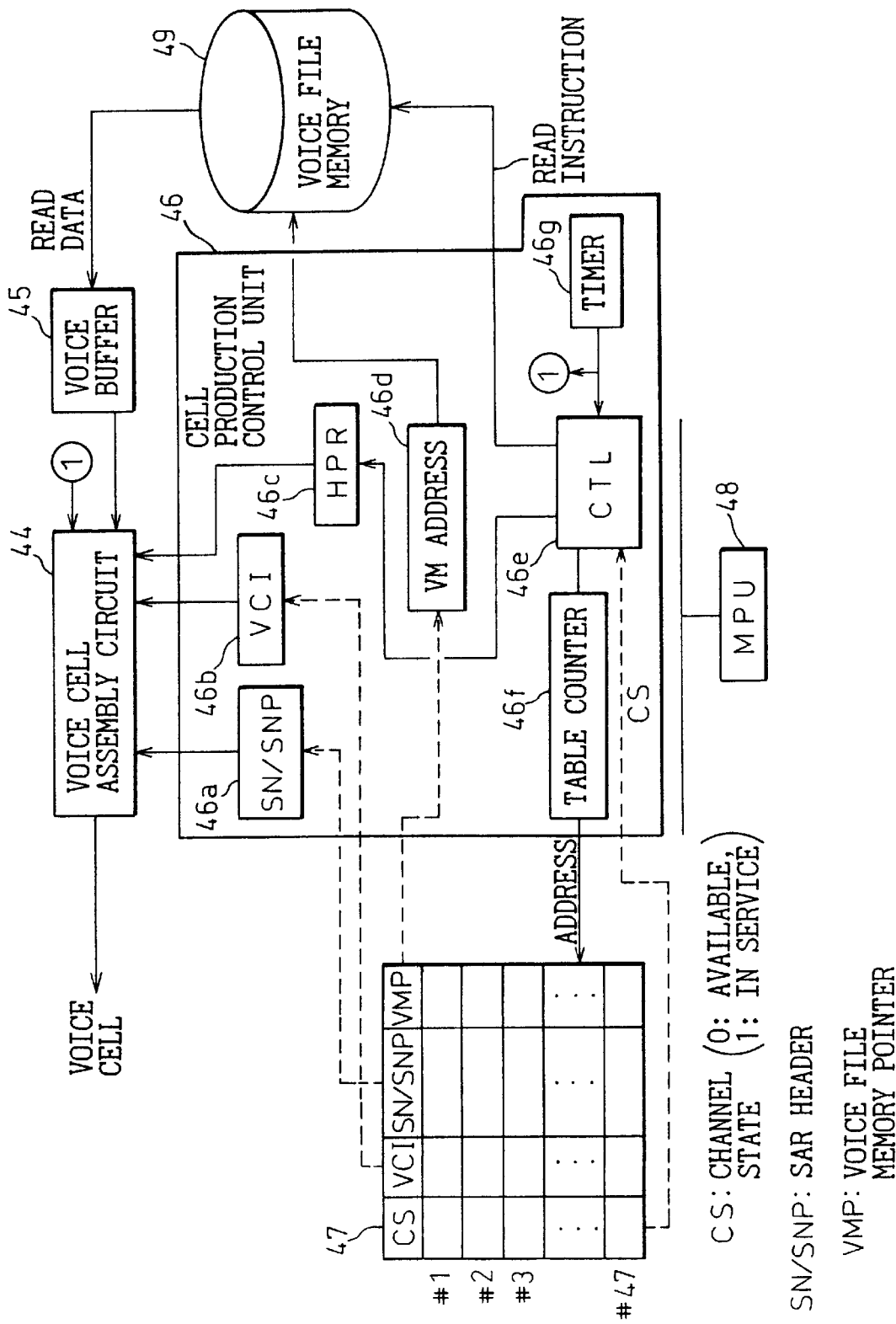
FIG. 10 is a diagram illustrating an example of the configuration of a cell production control unit and peripheral equipment.

FIG. 10 shows an example of the configuration of a cell production control unit and peripheral equipment.

FIG. 10 shows the components 44 to 49 shown in FIG. 9. The cell production control unit 46 includes a buffer 46a for storing a sequence number (SN) of 4 bits long and an SN protection key (SNP) of 4 bits long which constitute an SAR header of AAL Type 1 of an ATM cell, a buffer 46b for storing a virtual channel identifier (VCI), and a header parameter register (HPR) 46c for holding various parameters specified in a header. In the register, various parameter values are specified by the microprocessor unit 48 before the start of rendering a voice information service. The parameters are a generic flow control (GFC) level of 4 bits long, a virtual path identifier (VPI) of 8 bits, a payload type (PT) of 3 bits, and a cell loss priority (CLP) level of 1 bit.

Moreover, there are shown a buffer 46d for storing a pointer for use in reading (VM address) the voice memory (VM) 49, a controller (CTL) 46e responsible for the cell production control unit, a table counter 46f relating to the cell control table (CCT), and a timer 46g for generating an activation signal at intervals of 24 microseconds.

The cell control table 47 has channel states CS (whether each channel is available or in service is indicated with 0 or 1 of one bit), virtual channel identifiers (VCI) each having a length of 16 bits, sequence numbers and SN protection keys each having a length of 8 bits (1 byte), and pointers VMP for use in reading the voice file memory 49 associated with numbers (1 to 47) of virtual channels linking calling users.

When a call is terminated at a voice information service system, a received signal cell (obtained by the signal cell assembler dissembler 43 in FIG. 9) is checked to identify a virtual channel identifier of a calling terminal. A number of a virtual channel associated with an "available" channel state CS is retrieved from the cell control table 47. The CS bit is set to 1. The identified virtual channel identifier is specified in an associated VCI area in the table. The sequence number of the first cell (leading sequence number is 1) and its SN protection key are then specified. A pointer indicating leading voice information stored in the voice file memory 49 is specified in an associated VMP area. In this example, the cell control table 47 handles cell control information concerning a total of 47 channels Nos. 1 to 47. In other words, a voice cell for each channel is produced in a cycle of 5.875 msec. For producing voice cells for 47 channels during 5.875 msec., the processing time per channel should be set to 125 microseconds. When the processing times required by the voice cell assembly circuit 44 and cell production control unit 46 are shortened, if the processing time per channel is set to 124/2=62.5 microseconds, cells to be placed on 94 channels can be multiplexed.

Figure 11:
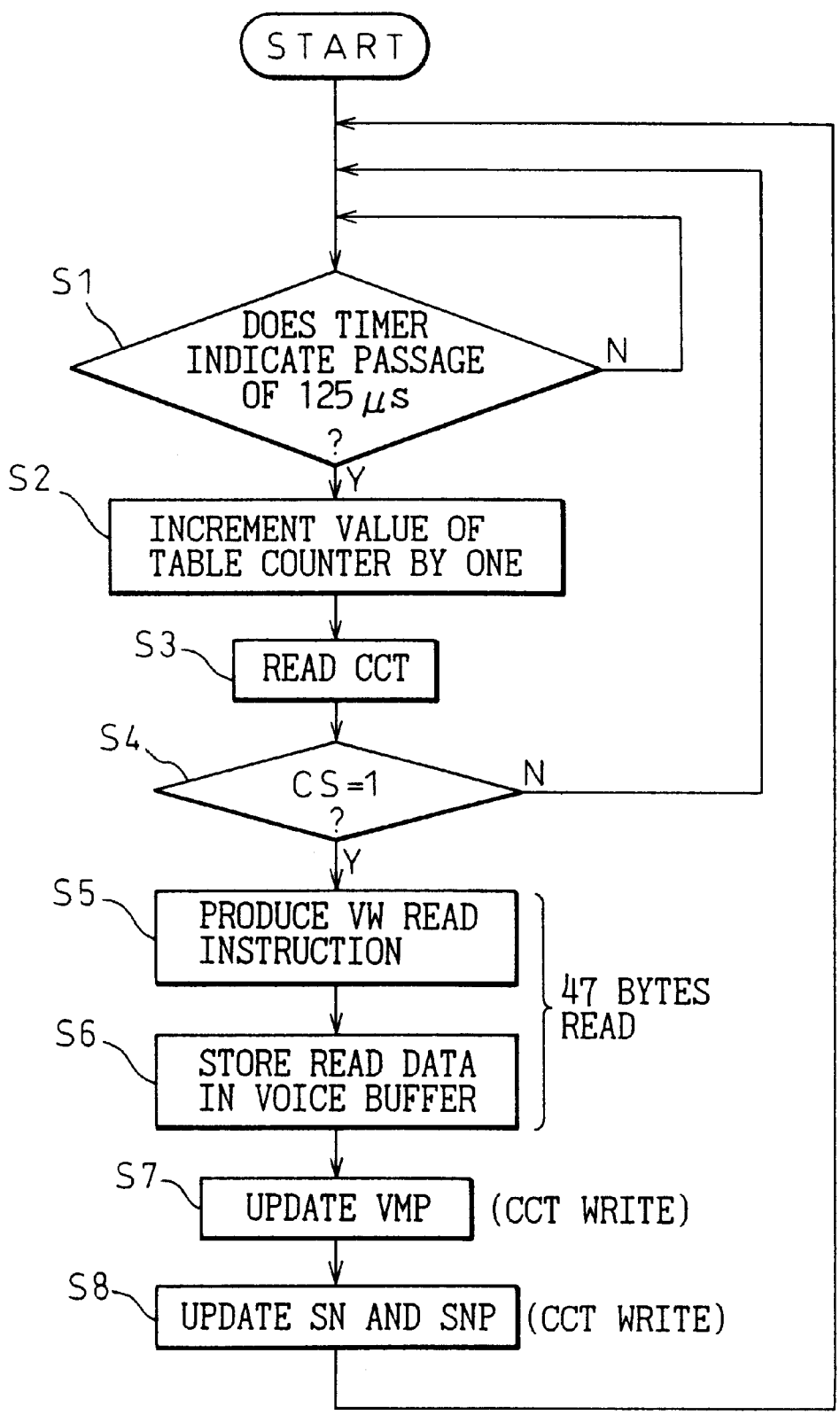
FIG. 11 is a diagram describing a control flow followed by the cell production control unit.

FIG. 11 describes a control flow followed by the cell production control unit.

When the cell production control unit 46 shown in FIG. 10 starts operating, it judges whether or not the tinier 46g indicates the passage of 125 microseconds (S1 in FIG. 11). If 125 microseconds has elapsed, the controller 46e increments the count value of the table counter 46f by one (S2), and reads the cell control table 47 using the count value as an address (S3). At this time, the voice cell assembly circuit 44 is also driven. The operation of the voice cell assembly circuit 44 will be described later in conjunction with FIG. 12. Information concerning a channel number associated with the address is read from the cell control table 47 in directions indicated with dashed lines. The controller 46e judges whether or not the CS bit is 1 (S4 in FIG. 11). When the CS bit is 0, nothing is carried out. Control is returned to an initial state.

When the CS bit is 1, read information is set in the buffers 46a, 46b, 46d shown in FIG. 10. Based on the address in the voice file memory (VM) set in the buffer 46d, a Read instruction is produced relative to the voice file memory 49 (S5 in FIG. 11). Read data of 47 bytes long read from the address is stored in the voice buffer (VB) 45 (S6).

Figure 12:
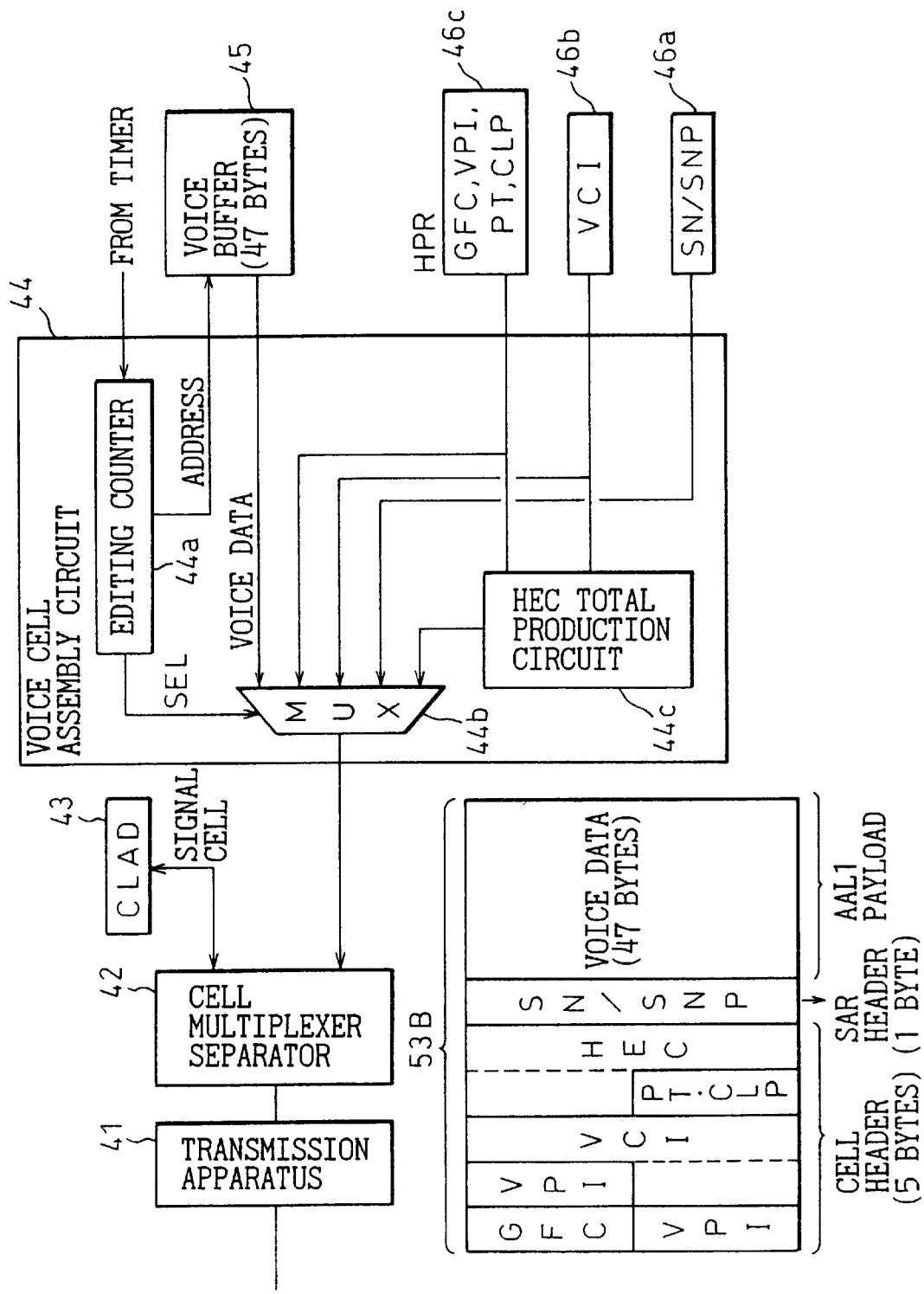
FIG. 12 is a diagram illustrating an example of the configuration of a voice cell assembly circuit.

The voice cell assembly circuit 44 specifies, as illustrated in FIG. 12, voice information of 47 bytes as payload of 46 bytes in size within a voice cell, fetches a sequence number and SN protection key from the buffer 46a, a virtual channel identifier from the buffer 46b, and various header parameters (a generic flow control level, payload type, cell loss priority level, header error control total, etc.) from the register 46c, assembles the fetched data items into a voice cell of 53 bytes long, and transmits the voice cell. A subsequent pointer is written in a VMP area associated with the channel whose information has been read from the cell control table 47, whereby the contents of the VMP area are updated (S7 in FIG. 11). Thereafter, a subsequent sequence number and SN protection key are written in an associated SN/SNP area, whereby the contents of the SN/SNP area are updated (S8). Thereafter, every time 125 microseconds elapses, the foregoing processing is repeated.

FIG. 12 shows an example of the configuration of the voice cell assembly circuit.

In FIG. 12, there are shown the same components 41 to 43 as those shown in FIG. 9, and the same components 44, 45, and 46a to 46c as those shown in FIG. 10. The description of the components will be omitted. The voice cell assembly circuit 44 includes an editing counter 44a for multiplexing and editing information items constituting a voice cell, a multiplexer (MUX) 44b, and an HEC total production circuit 44c for producing a header error control (HEC) total to be set as the last byte of a cell header of 5 bytes long.

The voice cell assembly circuit 44 is activated simultaneously with the cell production control unit 46 at intervals of 125 microseconds whose passage is indicated by the timer 46g in the cell production control unit 46 shown in FIG. 10. With an activation signal sent from the timer 46g, the editing counter 44a is initialized in order to arrange signals to be selected by the multiplexer 44b in such a way as they are arranged before cell assembly is started. Based on the value of the editing counter 44a, voice information temporarily stored in the voice buffer 45 is read successively.

The multiplexor 46b inputs voice data read from the voice buffer 45, all output of the header parameter register 46c, an output of the buffer 46b holding a virtual channel identifier, and an output of the buffer 46a holding a sequence number and SN protection key, as well as an output of the HEC total production circuit 44c.

The HEC total production circuit 44c computes the values of a generic flow control level, virtual path identifier, payload type, cell loss priority level, and virtual channel identifier supplied from the header parameter 46c and (Consisting of the first to fourth bytes of a cell header, as well as the value of a virtual channel identifier supplied from the buffer 46b holding a virtual channel identifier according to a predetermined polynomial, and outputs the result of the computation as a header error control total.

For cell assembly, signals to be input to the multiplexer 44b are selected responsively to an output of the editing counter 44a according to given timing in such a way that selected signals can constitute a voice cell formatted as shown in the lower part of FIG. 12. To be more specific, for a cell header serving as a leading part of a voice cell, the values of a generic flow control level (4 bits), virtual path identifier (8 bits), virtual channel identifier (16 bits), payload type (3 bits), cell loss priority level (1 bit), and header error control total (8 bits) are selected successively in that order. Thereafter, a sequence number and SN protection key (8 bits) serving as an SAR header are selected, and then voice data of 47 bytes long is read successively from the voice buffer 45. These data items are assembled to complete a voice cell.

With the components shown in FIGS. 9 to 12, an inexpensive voice information service system can be provided. A pair of a voice cell assembly circuit 44 and voice buffer 45 (in a cell production unit) has been described by taking the example in which signals to be placed on 47 virtual channels are multiplexed. Alternatively, a plurality of pairs of a voice cell assembly circuit 44 and voice buffer 45 which can operate in multiplex mode may be included in order to handle a larger number of channels.

Figure 13:
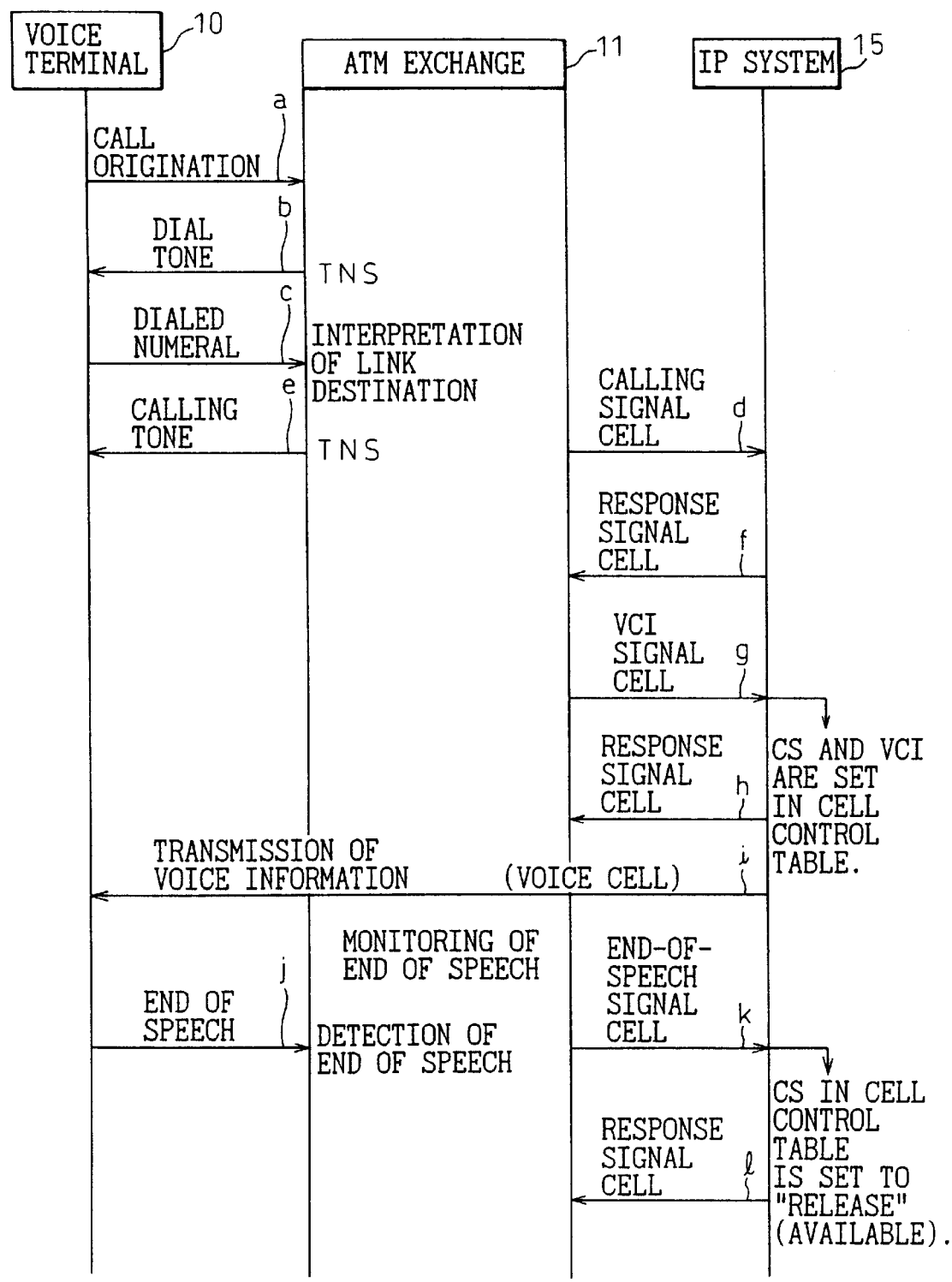
FIG. 13 is a diagram illustrating an example of a sequence of operations of all equipment including a network in which a voice information service system of the present invention is implemented.

FIG. 13 shows an example of a sequence of operations of all equipment including a network in which a voice information service system of the present invention is implemented.

In FIG. 13, there are shown the same components 10, 11, and 13 as those shown in FIGS. 6 and 7. Also shown are an analog voice terminal 10, an ATM exchange 11, and an IP system (including the components shown in FIG. 8 or 9).

When a user of the voice terminal 10 originates a call (a in FIG. 13), the ATM exchange 11 sends a dial tone (b). When the user sends a dialed numeral for designating a voice information service center (a provider which has installed a voice information service system) (c), the ATM exchange 11 carries out switching, sends a signal cell representing calling to the remote IP system 15 (d), and sends a ring-back tone to the voice terminal 10 (e). When the IP system 15 transmits a signal cell representing a response (f in FIG. 13), the ATM exchange 11 sends a signal cell containing a virtual channel identifier of a new virtual channel to the IP system 5 (g). The (MPU in) IP system sets the channel state of an available channel in the cell control table (36 in FIG. 8 and 47 in FIG. 9) to "in service," specifies the simultaneously-received virtual channel identifier in an associated VCI area, initializes the contents of the voice file memory, and transmits the signal cell representing a response to the ATM exchange 11 (h in FIG. 13).

Thereafter, in the IP system 15, when the processing cycle of the cell production control unit (35 in FIG. 8 and 46 in FIG. 9) comes back to the starting point, data items are read from the voice file memory. The foregoing components operate to product a voice cell, and transmission of voice information is started (i in FIG. 13). The voice cell is converted into an analog signal by the ATM exchange 11, and thus becomes audible by the user of the voice terminal 10. Thereafter, the ATM exchange 11 monitors the end of speech made on the channel in use, and detects the end of speech made at the voice terminal 10 (that the handset of the terminal is on-hook) (j), and transmits a signal cell representing the end of speech to the IP system 15. This causes the IP system 15 to set the associated channel state CS in the cell control table to "release" (0), transmits a signal cell representing a response (completion of release) to the ATM exchange 11 (1 in FIG. 13), and stops rendering the service.

According to the present invention, in compliance with the trend of communication networks toward B-ISDNs, a voice information service can be rendered to a maximum number of voice terminals continually and efficiently. Moreover, the cost of a voice information service system can be reduced by adopting multiplexing without, unlike the prior arts, the necessity of installing the number of trunks corresponding to the number of channels in an exchange.

What is claimed is:

1. A voice information service system to be connected onto an Asynchronous Transfer Mode (ATM) network, comprising:

a voice file for storing digitized voice information;

a voice buffer for temporarily storing voice information with a given length read from said voice file;

a voice cell assembly circuit for appending an Segmentation and Reassembly (SAR) header and cell header to voice information existent in said voice buffer;

a cell control table for storing cell control information in one-to-one correspondence with virtual channels for a plurality of incoming calls;

a signal cell assembler and dissembler for assembling and disassembling signal cells which are transmitted and received to or from said ATM network; and a control unit, activated at regular intervals, using said cell control table to control said voice file and cell assembler so as to control production and transmission of a voice information cell to be placed on a virtual channel, and processing control signals to be transmitted or received to or from said ATM network via said signal cell assembler and dissembler, wherein a voice information service is rendered over a plurality of virtual channels.

2. A system according to claim 1, further comprising a cell multiplexer separator for multiplexing signal cells supplied from said signal cell assembler and dissembler and cells containing voice information to be placed on a plurality of virtual channels, and then transmitting the cells onto said ATM network, and for separating signal cells sent from said AIM network, and then transferring the cells to said cell assembler and dissembler, wherein logical connection or release of a virtual channel onto or from said ATM network via said signal cell assembler and dissembler is controlled by handling a link for a signal cell as a virtual channel.

3. A system according to claim 1, wherein said control unit transmits or receives signal cells onto or from said ATM network via said signal cell assembler dissembler, and thus controls logical connection or release of a virtual channel.

4. A system according to claim 1, wherein said cell control table has areas for storing channel states each indicating whether or not a channel is in service, virtual channel identifiers, SAR headers of AAL Type 1, and pointers for use in reading a voice file memory respectively in one-to-one correspondence with virtual channels, and said control unit initializes the contents of the areas associated with an available virtual channel in said cell control table at the time of call termination, and produces a voice cell.

5. A system according to claim 1, wherein said control unit transmits voice information cells over the same virtual channel in a cycle of 5.875 msec., and thus transmits the voice information cells at a fixed speed.

6. A system according to claim 1, wherein said control unit is activated in a cycle of a quotient of 5.875 msec. by N when a maximum number N of virtual channels are accommodated, and thus the cell transmission density on a virtual path between said ATM network and voice information service system is kept constant.

7. A system according to claim 1, wherein: said control unit includes a table counter indicating an address in said cell control table associated with a virtual channel; and at every cyclic activation, said control unit reads cell control information concerning a virtual channel to be handled at that time instant from associated areas in said cell control table which are indicated by said table counter, reads voice information of 47 bytes long from a position pointed to by a pointer for use in reading the voice file memory which is contained in the cell control information, and updates the pointer in the cell control table after the reading.

8. A system according to claim 1, wherein for establishing logical connection of a new virtual channel, said control unit appends a pointer for use in reading the voice file memory, which is specified in an area associated with the virtual channel in said cell control table, to the start of voice information, and thus marks the head of voice information for each virtual channel.

9. A system according to claim 1, wherein said control unit includes a processor for controlling calls to be transferred onto or from said ATM network via said signal cell assembler dissembler, and a cell production control unit having said cell control table and controlling said cell assembler.

10. A system according to claim 2, wherein said control unit transmits or receives signal cells onto or from said ATM network via said signal cell assembler and dissembler, and thus controls logical connection or release of a virtual channel.

11. A system according to claim 4, wherein: said control unit includes a table counter for indicating an address in said cell control table associated with a virtual channel; and at every cyclic activation, said control unit reads information concerning a virtual channel to be handled at that time instant from associated areas in said cell control table which are indicated by said table counter, reads voice information of 47 bytes long from a position pointed to by a pointer for use in reading the voice file memory which is contained in the cell control information, and updates the pointer in said cell control table after the reading.

12. A system according to claim 4, wherein for establishing logical connection of a new virtual channel, said control unit appends a pointer for use in reading the voice file memory, which is specified in an area associated with the virtual channel in said cell control table, to the start of voice information, and thus marks the head of voice information for each virtual channel.

13. A system according to claim 7, wherein for establishing logical connection of a new virtual channel, said control unit appends a pointer for use in reading the voice file memory, which is specified in an area associated with the virtual channel in said cell control table, to the start of voice information, and thus marks the head of voice information for each virtual channel.

\* \* \* \* \*